United States Patent [19]

Nishizawa et al.

[11] Patent Number: 4,575,246

[45] Date of Patent: Mar. 11, 1986

[54] MICHELSON INTERFEROMETER

[75] Inventors: Seizi Nishizawa; Kikuo Shirawachi, both of Tokyo, Japan

[73] Assignee: Japan Spectroscopic Co., Ltd., Hachioji, Tokyo, Japan

[21] Appl. No.: 586,142

[22] Filed: Mar. 5, 1984

[51] Int. Cl.$^4$ ................................................ G01J 3/45
[52] U.S. Cl. .................................... 356/346; 318/640
[58] Field of Search ......................... 356/346; 318/640

[56] References Cited

U.S. PATENT DOCUMENTS

| | | | |
|---|---|---|---|
| 3,488,123 | 1/1970 | Nichols | 356/346 |
| 3,634,682 | 1/1972 | Gold | 356/351 X |
| 4,413,908 | 11/1983 | Abrams et al. | 356/346 |

FOREIGN PATENT DOCUMENTS 524074 11/1976 U.S.S.R. .............................. 356/346

OTHER PUBLICATIONS

Thompson et al., "A Motor-Micrometer-Driven Infrared Fourier-Transform Spectrometer"; Pubs. Astrom. Soc. of the Pacific, vol. 87, No. 520, pp. 929-932, 12/1975.
Yoshimura et al., "Optical Frequency Shifting for Rayleigh Scattering Spectroscopy", J. Phys. E. Sci. Instrum., vol. 11, pp. 777-779, 1978.

Primary Examiner—Vincent P. McGraw
Assistant Examiner—Matthew W. Koren
Attorney, Agent, or Firm—Wenderoth, Lind & Ponack

[57] ABSTRACT

A continuous drive type Michelson interferometer system for use in Fourier spectroscopy, having a main Michelson interferometer for obtaining the interferogram of a sample, an auxiliary Michelson interferometer for detecting the moving speed of a movable mirror of said main Michelson interferometer, and a control section for controlling the driving speed of said movable mirror. In said control section, the AC output signal of a photodetector is converted into a voltage corresponding to the frequency of the signal, said voltage is compared with a preset voltage by a voltage difference detection means, the phase of said AC output of said photodetector is compared with a phase of a reference signal by a phase comparison means, and said driving speed is controlled by both the outputs of said voltage difference detection means and said phase comparison means.

3 Claims, 4 Drawing Figures

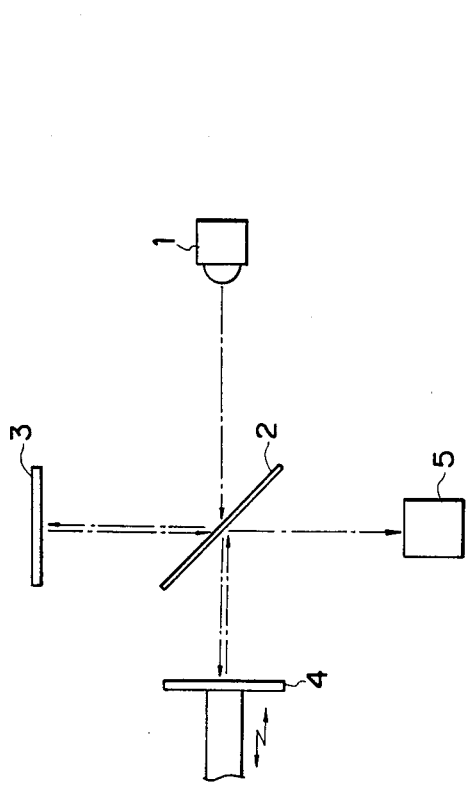
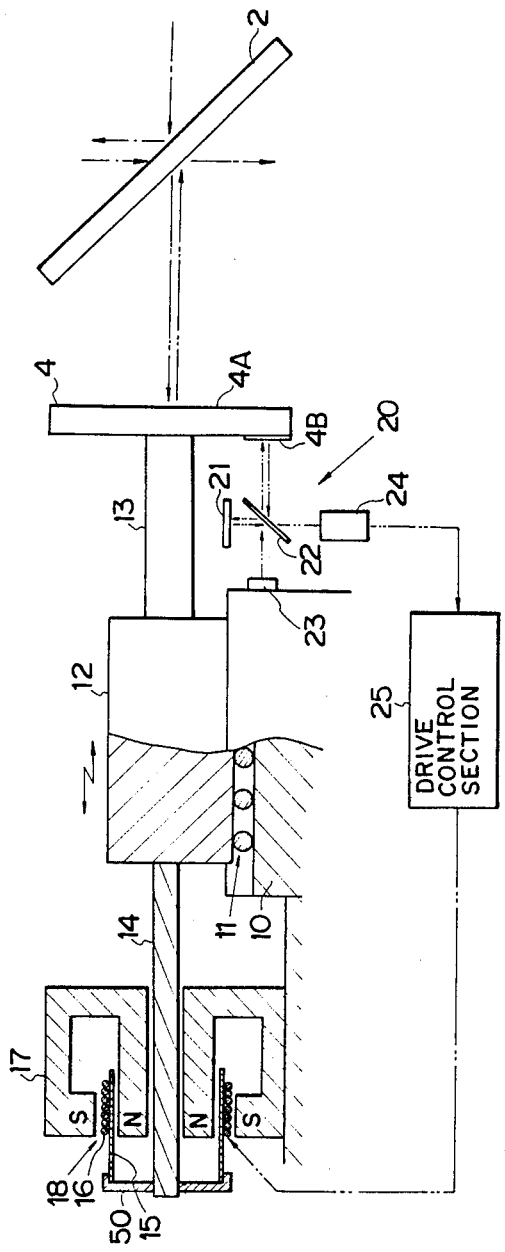
FIG. 1
FIG. 2

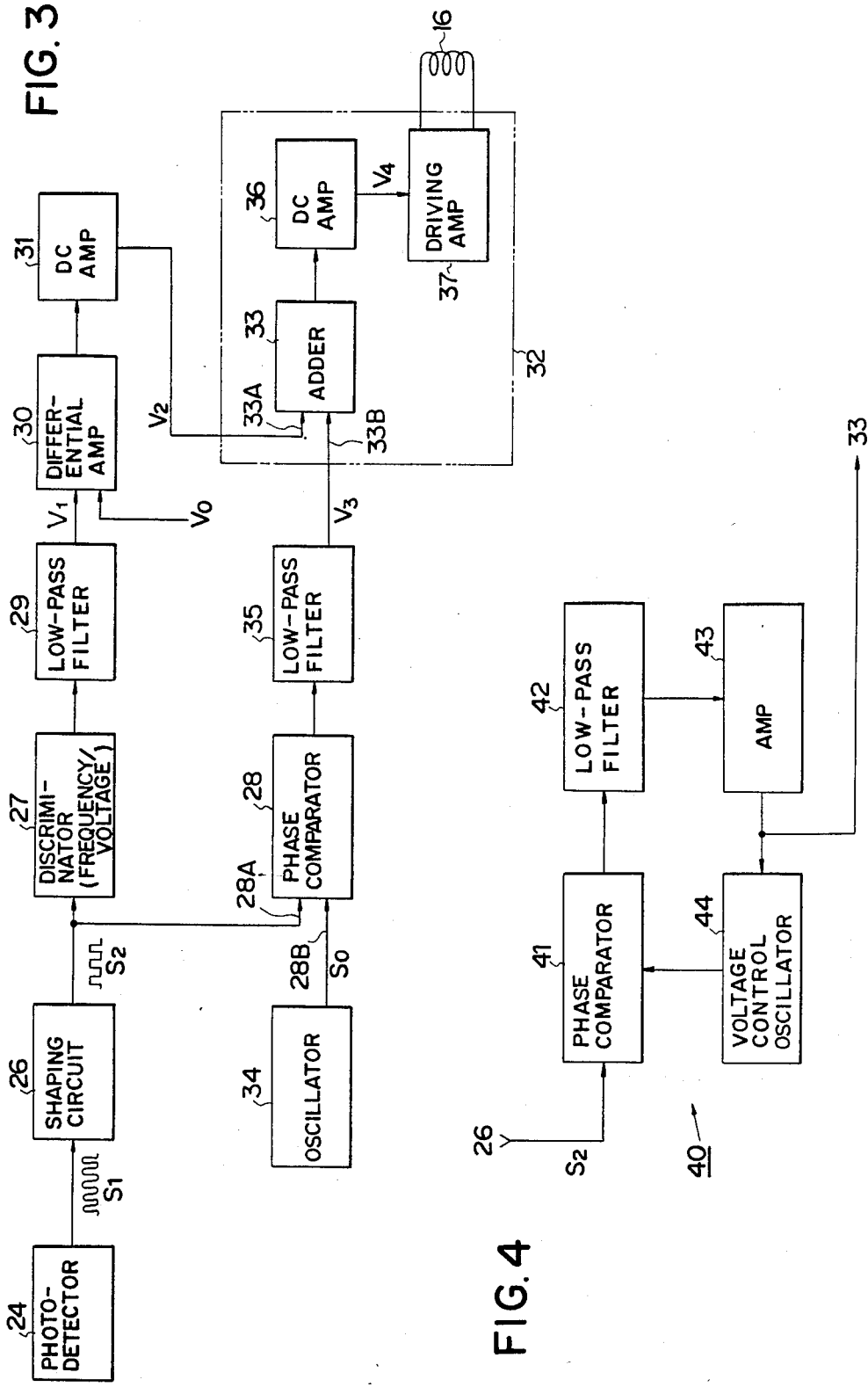

MICHELSON INTERFEROMETER

BACKGROUND OF THE INVENTION

This invention relates to a continuous drive type Michelson interferometer for use in Fourier spectroscopy, and more particularly, to means for controlling constant the movement of a movable mirror of such a Michelson interferometer.

One of well-known processes for spectroscopic analysis of various specimens is Fourier spectroscopy using a Michelson interferometer. The principle of the Michelson interferometer will be briefly described with reference to FIG. 1. The Michelson interferometer is an interferometer in which light from a source 1 strikes a beam splitter 2 at an angle of 45° where the light is divided into two beams, that is, light beams reflected and transmitted by the splitter 2. The reflected beam is directed to a stationary mirror 3 and reflected thereby, the transmitted beam is directed to a movable mirror 4 and reflected thereby, and the beams are then recombined by the beam splitter 2 to enter a detector 5 where interference fringes are formed due to the difference between the beam paths. In carrying out Fourier spectroscopy, the movable mirror is continuously moved at a predetermined constant speed in a direction toward and away from the beam splitter. The detector responds to the continuously varying interference fringes to produce an AC signal (Interferogram) which is Fourier transformed by means of a computer. Provided that the movable mirror is moved at a predetermined constant speed v, the beam path difference x becomes a function of time t, that is, $x=2vt$, and therefore, the output of the detector also becomes a function of time. A light component having a wave number $\nu$ is converted into an AC signal having a frequency $f=2v\nu$ Hz.

It is to be noted that the sample to be analyzed is generally located in that portion of a beam path along which a light beam travels from the beam splitter 2 to the photodetector 5. In order to compare the sample with the reference material, the beam path from the beam splitter 2 to the photodetector 5 is generally divided into two beam paths, and a cell filled with the sample is inserted in one beam path and a cell filled with the reference material is inserted in the other beam path.

The above-described continuous mirror drive is required to maintain the moving speed of the movable mirror accurately constant. More specifically, it is required for spectral analysis to move the movable mirror at the predetermined constant speed with a precision of the order of wave length unit, that is, a few micronmeters ($\mu$m). To this end, conventional continuous drive type Michelson interferometers generally use electromagnetic drive means, like voice coils often used in speakers, in order to drive the movable mirror to thereby facilitate electrical precise control, and a pneumatic bearing in order to support and guide the movable mirror during movement. For the purpose of controlling the moving speed of the movable mirror, an auxiliary Michelson interferometer is often built in the main Michelson interferometer by forming an auxiliary mirror on the rear side of the movable mirror (that is, that surface of the movable mirror which is opposed to the main reflective surface facing the beam splitter of the main Michelson interferometer). A small sized Michelson interferometer is constructed using this auxiliary mirror as a movable mirror. The auxiliary interferometer uses a light source capable of emitting a light beam of a particular wavelength, that is, a He-Ne laser beam. A detector of the auxiliary interferometer detects the interference fringes of light of the particular wavelength formed during movement of the movable mirror, to thereby produce an AC signal whose frequency corresponds to the moving speed of the movable mirror. This correspondence of the signal frequency to the moving speed allows the mirror driving means to be controlled in a feedback manner such that the voltage converted from the frequency of the AC signal may have the same magnitude as the preset voltage.

The prior art continuous drive type Michelson interferometers as mentioned above, however, have the following problems because pneumatic bearings are used to support and guide the movable mirror. The pneumatic bearings are relatively large-sized and require the use of a compressor which adds to the cost. Other disadvantages of the pneumatic bearings are that they are less durable, that foreign matters into the lubricating space can prevent smooth movement, and that bearing elements are considerably difficult to machine.

It will be envisioned to use mechanical support means such as roller bearings for the purpose of supporting and guiding the movable mirror. The use of such mechanical support means will eliminate the problems associated with pneumatic bearings and is less costly. The mechanical support means such as roller bearings, however, have the drawback that they cannot maintain the mirror moving speed constant under load fluctuation, resulting in speed variations which induce errors. This drawback is not completely eliminated by adding an auxiliary Michelson interferometer such that the moving speed of the movable mirror is controlled in accordance with the AC signal of the detector of the auxiliary interferometer. It has been recognized difficult to actually use mechanical support means like roller bearings to support and guide the movable mirror during movement.

It is, therefore, an object of the present invention to provide a continuous drive type Michelson interferometer system which can control the moving speed of the movable mirror constant with significantly higher precision than in the prior art and allows mechanical support means such as a roller bearing to support and guide the movable mirror during movement, thereby reducing the cost and increasing the effective life of the interferometer as compared with prior art ones.

SUMMARY OF THE INVENTION

According to the present invention, there is provided a continuous drive type Michelson interferometer system comprising a main Michelson interferometer including a movable mirror, a beam splitter, and drive means for continuously moving the movable mirror in a direction toward and away from the beam splitter, an auxiliary Michelson interferometer including an auxiliary movable mirror in the form of a specular surface formed on said movable mirror in a plane perpendicular to the direction of movement of said movable mirror, and a detector for detecting the interference fringes of light having a given wavelength with the movement of the movable mirror to produce an AC signal, and a control section connected to said detector for receiving the signal of said detector to control the driving speed of said drive means, said control section including frequency/voltage conversion means for converting the AC output signal of the detector of said auxiliary Michelson interferometer into a voltage corresponding to the frequency of the signal, voltage difference detection means for comparing the voltage developed by said conversion means with a preset voltage to produce a signal representative of the difference, phase comparison means for phase comparing the AC output signal of said detector with a signal at a preset frequency to produce a signal representative of the phase difference, and control means adapted to respond to both the outputs of said voltage difference detection means and said phase comparison means for controlling the driving speed of said movable mirror drive means.

BRIEF DESCRIPTION OF THE DRAWINGS

The above and other objects, features, and advantages of the present invention will be more fully understood by reading the following description taken in conjunction with the accompanying drawings, in which:

FIG. 1 illustrates the optical system of a typical Michelson interferometer;

FIG. 2 is a schematic, partially cut-away, view of the apparatus for driving the movable mirror of the Michelson interferometer system according to the present invention;

FIG. 3 is a block diagram of a drive control section associated with the driving apparatus of the Michelson interferometer according to the present invention; and FIG. 4 is a block diagram showing a PLL arrangement used in the drive control section of FIG. 3.

DESCRIPTION OF THE PREFERRED EMBODIMENTS

Referring to FIG. 2, there is schematically illustrated the mechanical construction of the apparatus for driving a movable mirror of a Michelson interferometer according to one embodiment of the present invention. A movable block 12 is rested for linear motion in a given direction on a stationary base 10 through mechanical support and guide means in the form of a rotation bearing or plain bearing, for example, a roller bearing 11. The movable block 12 has a first rod 13 projecting from one end in the direction of movement and having a distal end to which a movable mirror 4 is attached at right angles. The movable block 12 also has a second rod 14 projecting from the opposed end in the direction of movement and having a distal end to which a hollow cylinder 15 is attached by means of a circular hub 50. Preferably, the first and second rods 13 and 14 are in coaxial alignment. Around the cylinder 15 is wrapped a coil 16 which corresponds to a voice coil in a moving coil-type speaker and in this embodiment, constitutes a driving source. The coil 16 is placed in an annular gap 18 defined by a magnet 17 having the same configuration as a magnet in a moving coil-type speaker. The movable mirror 4 has a main specular surface 4A on its surface opposite to the first rod 13. The main specular surface 4A constitutes the main Michelson interferometer and is set precisely perpendicular to the direction of movement. A main beam splitter 2 is located at an angle of 45° with respect to the main specular surface 4A. The main Michelson interferometer further includes a main source of light, a main stationary mirror, and a main detector (all not shown in FIG. 2) like conventional Michelson interferometers. Of course, the interferometer is designed such that light from the main source strikes the beam splitter 2, the light beams reflected and transmitted by the splitter are reflected by the stationary mirror and the specular surface 4A of the movable mirror 4 and then recombined by the splitter 2 to enter the detector, as previously described in conjunction with FIG. 1. It is thus readily understood that the main beam splitter 2 and the specular surface 4A of the movable mirror 4 constitute a part of the main Michelson interferometer.

On that surface of the movable mirror 4 which is perpendicular to the direction of movement thereof, preferably on that surface (rear surface) of the movable mirror 4 which is placed opposite to the main beam splitter 2, an auxiliary specular surface 4B is formed separately from the main specular surface 4A. On the side of this auxiliary specular surface 4B, an auxiliary Michelson interferometer 20 is provided in which the auxiliary specular surface 4B serves as the movable mirror. More specifically, an auxiliary stationary mirror 21, an auxiliary beam splitter 22, a laser source 23, and a photodetector 24, all mounted fixedly, are combined with the auxiliary specular surface 4B as the movable mirror to constitute an auxiliary Michelson interferometer of smaller size. The laser source 23 is, for example, a He-Ne laser source capable of emitting a laser beam of 632.8 nm. The photodetector 24 is a photoelectric device such as a photomultiplier and electrically connected to a drive control section 25 for controllingly energizing the coil 16.

In the arrangement shown in FIG. 2, the electric current introduced by the control section 25 across the coil 16 causes the coil 16 to cooperate with the magnet 17, thereby axially moving the coil 16 along with the hollow cylinder 15 according to the same principle as the moving coil-type speaker. Consequently, the movable block 12 connected to the cylinder 15 is linearly moved (to the right and left in the plane of FIG. 2) while it is supported and guided by the support and guide means 11 such as a roller bearing. Consequently, the movable mirror 4 is continuously moved in a direction perpendicular to the main and auxiliary specular surfaces 4A and 4B. In this way, the main Michelson interferometer including the main beam splitter 2, the main specular surface 4A of the movable mirror 4, and the main light source and main photodetector (not shown) performs interference spectral analysis.

On the other hand, the auxiliary Michelson interferometer 20 including the auxiliary specular surface 4B formed on the rear side of the movable mirror 4 functions as follows. The photodetector 24 responds to the interference fringes of a light beam of a particular wavelength, for example, a He-Ne laser beam having a wavelength of 632.8 nm, to thereby produce an AC signal having a frequency corresponding to the moving speed of the movable mirror 4 with the movement thereof. The output signal of the photodetector 24 is fed to the drive control section 25 so that the driving current to the coil 16 serving as the driving source for moving the movable mirror 4 is controlled in a feedback fashion.

FIG. 3 shows one example of the drive control section 25 for controlling the operation of the coil 16. In the block diagram of FIG. 3, an output signal $S_1$ of the photodetector 24 is fed to a wave shaping circuit 26 whose output signal $S_2$ is delivered to both a discriminator 27 and to a phase comparator 28 at one input terminal 28A. The discriminator 27 serves as frequency/voltage conversion means for generating a voltage $V_1$ corresponding to the frequency of the signal $S_2$. An output of the discriminator 27 is then fed through a low-pass filter 29 to a differential amplifier 30 which serves as means for detecting the difference between the input voltage and a preset voltage $V_0$. An output of the differential amplifier 30 is applied to an adder circuit 33 of control means 32 (to be described later) as a DC voltage $V_2$ through a DC amplifier 31. The phase comparator 28 which receives the output signal $S_2$ of the shaping circuit 26 also receives on the other input terminal 28B a reference signal $S_0$ from a reference signal oscillator 34, for example, a quartz crystal oscillator. The comparator 28 compares in phase the signal $S_2$ with the reference signal $S_0$ to produce an output representative of the phase difference therebetween, which is, in turn, applied to the adder circuit 33 as a voltage $V_3$ through a low-pass filter 35. The adder circuit 33 produces an output of $V_2+V_3$, which is delivered to a DC amplifier 36 whose output is, in turn, applied as a control voltage $V_4$ to a driving amplifier 37 for generating electric current to energize the coil 16.

In the drive control section 25 as described above, the signal $S_1$ generated by the photodetector 24 during movement of the movable mirror 4 is an AC signal having a frequency corresponding to the moving speed of the movable mirror. That is, the frequency of the signal $S_1$ is proportional to the moving speed of the movable mirror 4. If there occur slight variations in the moving speed of the movable mirror 4, a phase deviation would be introduced in the signal $S_1$ of the detector 24. The signal $S_1$ is thus regarded as a signal representative of the position of the movable mirror 4.

When the moving speed of the movable mirror 4 is kept at the intended or predetermined speed, that is, the moving speed is constant, the output signal of the photodetector 24 maintains the fixed frequency corresponding to the predetermined speed, and the output voltage $V_1$ of the discriminator 27 as the frequency/voltage conversion means maintains the fixed magnitude corresponding to the predetermined speed. In this case, since the voltage $V_1$ applied to the differential amplifier 30 through the low-pass filter 29 is equal to the preset voltage $V_0$, the output of the differential amplifier 30 becomes zero, and consequently, the input voltage $V_2$ to the first input terminal 33A of the adder circuit 33 becomes zero. If the phase of the output signal $S_1$ of the photodetector 24 is coincident in phase with the reference signal $S_0$ from the reference signal oscillator 34 at this point, the output of the phase comparator 28 becomes zero, the input voltage $V_3$ to the second input terminal 33B of the adder circuit 33 also becomes zero, and consequently, the output voltage of the adder circuit 33 also becomes zero. Then, the control voltage $V_4$ of the drive amplifier 37 becomes zero. As a result, the driving speed of the movable mirror 4 is kept unchanged. However, even when the moving speed is equal to the predetermined speed, that is, the frequency of the output signal $S_1$ of the photodetector 24 has a value corresponding to the predetermined speed, there is a likelihood that a phase difference will appear between the signal $S_1$ and the reference signal $S_0$. In such a case, the phase comparator 28 develops a voltage corresponding to the phase difference. This output voltage is applied to the adder circuit 33 as the voltage $V_3$ through the low-pass filter 35 and then applied to the driving amplifier 37 as the control voltage $V_4$ through the adder circuit 33. As a result, a slight temporary change is made on the moving speed of the movable mirror 4 to change and correct the phase such that the phase difference becomes equal to zero. Thereafter, the frequency and phase are kept constant. That is, the movable mirror 4 continues to move at the predetermined constant speed.

If variations of a considerable magnitude occur in the moving speed of the movable mirror 4 due to load fluctuation or the like, then the frequency of the output signal $S_1$ of the photodetector 24 will vary to create a difference between the input voltage $V_1$ to the differential amplifier 30 and the preset voltage $V_0$. The differential amplifier 30 then produces a voltage corresponding to this difference, that is, the difference between the predetermined speed and an actual moving speed. This voltage $V_2$ is applied to the first input terminal 33A of the adder circuit 33. The output of the adder circuit 33 is applied to the driving amplifier 37 as the control voltage $V_4$ through the DC amplifier 36. As a result, some change is made on the moving speed of the movable mirror 4. More specifically, the moving speed of the movable mirror 4 is changed such that the output signal $S_1$ of the photodetector 24 may comply with the frequency corresponding to the predetermined constant speed. Usually, a phase difference yet remains even after completion of frequency correction. This phase difference is also controlled to zero in the same manner as described above. Therefore, the moving speed of the movable mirror 4 becomes essentially fixed.

When the moving speed of the movable mirror 4 undergoes a small variation, but sufficient to cause a phase deviation irrespective of little change in the frequency of the output signal $S_1$ of the photodetector 24, the moving speed of the movable mirror 4 is controlled so that the phase difference becomes zero. In this way, such a small speed variation is instantaneously eliminated.

As understood from the foregoing, a rough adjustment is made in terms of frequency and a fine adjustment is made in terms of phase so that the movable mirror 4 continues to move at the predetermined speed in a stable manner.

It is contemplated for commercial application that the circuit block consisting of the reference signal oscillator 34, phase comparator 28, and low-pass filter 35 may be so-called phase locked loop (PLL) circuitry. Such a PLL circuit is illustrated generally at 40 in FIG. 4 as comprising a phase comparator 41, a low-pass filter 42 connected to the comparator, an amplifier 43 connected to the filter, and a voltage controlled oscillator (VCO) 44 connected to the amplifier 43 and the comparator 41. With this arrangement, since the output of the amplifier 43 corresponds to any deviation in phase, this circuit functions in the same manner as above.

Although the control means 32 includes the adder circuit 33 in the above-illustrated embodiment, the control means 32 may be of a different construction in which the adder circuit 33 is excluded. The control means 32 is required in an essential sense that the moving speed of the movable mirror 4 is controlled and adjusted in response to both the output of the voltage difference detection means in the form of the differential amplifier 30 and the output of the phase comparator 28 such that the frequency of the output signal of the photodetector 24 may have a value corresponding to the predetermined speed and the phase of the output signal may become constant. Therefore, the control means 32 may be constructed such that primary control is preferentially made in response to the output of the differential amplifier 30, and secondary control is then made in response to the output of the phase comparator 28 after the output of the differential amplifier 30 becomes null.

Although the reference voltage $V_0$ applied to the differential amplifier 30 is described as corresponding to the predetermined speed in the foregoing embodiment, the reference voltage may be a voltage corresponding to the predetermined speed plus a certain bias voltage depending on the particular construction of the control means 32. In this case, when the frequency of the output signal $S_1$ of the photodetector 24 becomes corresponding to the predetermined speed, the differential amplifier 30 develops an output voltage which is not equal to zero, but equal to the bias voltage.

As apparent from the foregoing description, an apparatus for driving the movable mirror of the continuous drive type Michelson interferometer system according to the present invention is capable of controlling the moving speed of the movable mirror to the predetermined constant speed with a high precision. Even when the movable mirror is supported and guided by mechanical support and guide means such as a roller bearing which would often cause variations in moving speed due to load fluctuations or the like, the occurrence of variation in the moving speed of the movable mirror is minimized to enable high precision spectral analysis. The present invention thus allows mechanical support and guide means such as a roller bearing to be actually used to support and guide the movable block connected to the movable mirror. The use of such mechanical support and guide means, of course, has several benefits including reduced cost and improved durability of the overall interferometer system.

What we claim is:

1. A continuous drive type Michelson interferometer system comprising
    a main Michelson interferometer including a movable mirror, a beam splitter, and drive means for continuously moving the movable mirror in a direction toward and away from the beam splitter,
    an auxiliary Michelson interferometer including an auxiliary movable mirror in the form of a specular surface formed on said movable mirror in a plane perpendicular to the direction of movement of said movable mirror, and a detector for detecting the interference fringes of light having a given wavelength with the movement of the movable mirror to produce an AC signal, and
    a control section connected to said detector for receiving the signal of said detector to control the driving speed of said drive means,
    said control section including
        frequency/voltage conversion means for converting the AC output signal of the detector of said auxiliary Michelson interferometer into a voltage corresponding to the frequency of the signal,
        voltage difference detection means for comparing the voltage developed by said conversion means with a preset voltage to produce a signal representative of the difference,
        phase comparison means for phase comparing the AC output signal of said detector with a signal at a preset frequency to produce a signal representative of the phase difference, and
        control means adapted to respond to both the outputs of said voltage difference detection means and said phase comparison means for controlling the driving speed of said movable mirror drive means.

2. The Michelson interferometer system according to claim 1 which further comprises mechanical means for supporting and guiding the movable mirror during movement.

3. The Michelson interferometer system according to claim 1 wherein said phase comparison means comprises phase locked loop circuitry.

* * * * *